United States Patent
Simison et al.

(10) Patent No.: US 7,831,629 B2
(45) Date of Patent: Nov. 9, 2010

(54) METHOD FOR BUILDING DATA ENCAPSULATION LAYERS FOR HIGHLY VARIABLE SCHEMA

(75) Inventors: Christopher M. Simison, Redmond, WA (US); Remi Alain Lemarchand, Redmond, WA (US); James M. Lyon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 479 days.

(21) Appl. No.: 11/326,886

(22) Filed: Jan. 6, 2006

(65) Prior Publication Data

US 2007/0174322 A1    Jul. 26, 2007

(51) Int. Cl.
*G06F 17/00* (2006.01)
(52) U.S. Cl. .................................... 707/802; 707/803
(58) Field of Classification Search ............... None
See application file for complete search history.

(56) References Cited

U.S. PATENT DOCUMENTS

| | | | | |
|---|---|---|---|---|
| 5,291,583 A * | 3/1994 | Bapat | ......................... | 717/137 |
| 5,721,909 A | 2/1998 | Oulid-Aissa et al. | ........ | 395/610 |
| 5,878,411 A | 3/1999 | Burroughs et al. | ............. | 707/4 |
| 5,990,883 A | 11/1999 | Byrne et al. | ................. | 345/327 |
| 6,026,408 A | 2/2000 | Srinivasan et al. | .......... | 707/103 |
| 6,240,422 B1 | 5/2001 | Atkins et al. | ................. | 707/102 |
| 6,418,446 B1 | 7/2002 | Lection et al. | .............. | 707/103 |
| 6,421,682 B1 * | 7/2002 | Craig et al. | ............. | 707/103 R |
| 6,766,326 B1 | 7/2004 | Cena | .......................... | 707/101 |
| 6,834,287 B1 | 12/2004 | Folk-Williams et al. | ..... | 707/103 |
| 6,999,956 B2 * | 2/2006 | Mullins | ........................ | 707/2 |
| 7,089,262 B2 * | 8/2006 | Owens et al. | ........... | 707/103 R |
| 7,127,474 B2 * | 10/2006 | Williamson et al. | ...... | 707/103 R |
| 7,143,156 B2 * | 11/2006 | Menzies et al. | ............. | 709/223 |
| 7,152,070 B1 * | 12/2006 | Musick et al. | .............. | 707/101 |
| 7,664,742 B2 * | 2/2010 | Pettovello | ....................... | 707/3 |
| 2002/0165865 A1 | 11/2002 | Hosokai | ..................... | 707/100 |
| 2003/0172196 A1 * | 9/2003 | Hejlsberg et al. | ........... | 709/328 |
| 2003/0220893 A1 | 11/2003 | Dettinger et al. | ............... | 707/1 |
| 2004/0044671 A1 | 3/2004 | Yoshimura et al. | .......... | 707/100 |
| 2004/0210839 A1 * | 10/2004 | Lucovsky | ................... | 715/516 |
| 2005/0044103 A1 | 2/2005 | MacLeod et al. | ............ | 707/102 |
| 2005/0050068 A1 * | 3/2005 | Vaschillo et al. | ............ | 707/100 |
| 2005/0065927 A1 | 3/2005 | Nouri et al. | ..................... | 707/4 |
| 2005/0223022 A1 | 10/2005 | Weissman et al. | ........... | 707/102 |

OTHER PUBLICATIONS

Dennis Sosnoski, Java programminig dynamics, Part 2: Introducing reflection, Jun. 2003, IBM (IBM. com), pp. 1-12.*

Giuseppe Attardi et al., Self reflection for adaptive programming, 2002, Springerlink (springerlink.com) p. 50-65.*

(Continued)

*Primary Examiner*—Neveen Abel Jalil
*Assistant Examiner*—Jacques Veillard
(74) *Attorney, Agent, or Firm*—Woodcock Washburn LLP

(57) ABSTRACT

The relationships between physical data store schema, object model, and end-user property may be encoded in the source of the object model using attributes. Reflection may be used to build the table of those relationships so that changes to the relationships between those three layers can be easily and quickly made without impacting higher levels in the software stack.

18 Claims, 4 Drawing Sheets

OTHER PUBLICATIONS

Chitchyan, R. et al., "AOP and Reflection for Dynamic Hyperslices", Computer Department, Lancaster University, 2004, http://cs.wise.edu/~chenl/qualify, 3 pages.

Banerjee, J. et al., "Data Model Issues for Object-Oriented Applications", *ACM Transactions on Office Information Systems*, 1987, 59(1), 3-26.

Kim, W., "Object-Oriented Database Systems: Promises, Reality, and Future", *proceedings of the 19th VLDB Conference*, 1993, 676-687.

Olz, M. et al., "Applying a Flexible OODBMS-IRS-Coupling to Structured Document Handling", *12th International Conference on Data Engineering*, 1996, 2 pages.

* cited by examiner

```
internal void AddMapiSchemaMapEntriesForType(
    Type type,
    MapiObjectTypes objectType,
    ref ArrayList mappedPropList)
{
    // For methods, we care about statics and instance methods --- we want to find
    // "ViewMappingFunction"'s.
    //
    MethodInfo [] methods = type.GetMethods(
        BindingFlags.Instance    |
        BindingFlags.NonPublic   |
        BindingFlags.Public      |
        BindingFlags.Static);
    foreach (MethodInfo method in methods)
        AddOrUpdateSchemaMapEntryForMethod(
            method,
            objectType,
            ref mappedPropList);

// For properties, we only care about instance properties --- we only want to find
    // property mappings and "ViewMappingColumn"'s.
    //
    PropertyInfo [] properties = type.GetProperties(
        BindingFlags.Instance    |
        BindingFlags.NonPublic   |
        BindingFlags.Public);
    foreach (PropertyInfo property in properties)
        AddOrUpdateSchemaMapEntryForProperty(
            property,
            objectType,
            ref mappedPropList);
}
```

FIG. 2

```
internal virtual void MapiGetProps(MapiPropTag [] MapiPropTags,
                                    out object [] propValues)
{
    int numProps = MapiPropTags.Length;

// Loop through the request array and fill the property values
    propValues = new object[numProps];
    for (int propIndex = 0; propIndex < numProps; propIndex++)
    {
        MapiPropTag mapiPropTag = mapiPropTags[propIndex];
        MapiSchemaMapEntry entry = SchemaMap[mapiPropTag, objectType];

if (null != entry)
        {
            if (null == entry.ExchangeToMapi)
            {
                propValues[propIndex] = new ExExceptionNotFound(
                    "Property " + shimPropTag.ToString() + " No mapping function found");
                continue;
            } object originalValue = entry.ExchangeToMapi.Invoke(this, null);
            propValues[propIndex] = originalValue;
        }
        else
        {
            // default. treat it as an extended property
            propValues[propIndex] = GetExtendedProperty(mapiPropTag);
        }
    }
}
```

FIG. 3

METHOD FOR BUILDING DATA ENCAPSULATION LAYERS FOR HIGHLY VARIABLE SCHEMA

BACKGROUND

Predefined-schema data storage systems, such as relational databases such as SQLServer from Microsoft and Oracle from Oracle, for example, may be based on a relational data model in which the schema of the data model is defined in advance of use (i.e., at "data definition" time, which is separate from and earlier than "data manipulation" time). Applications written to use these systems must be aware of the schema, and changes to that schema are very disruptive because the model is predicated on "data definition" being advance of "data manipulation."

There are, however, many applications—such as messaging systems like Exchange from Microsoft Corp, that are not able to describe their full schema in advance of use because the schema (e.g., the "MAPI" data model in the case of Exchange) may be modified at any point in time by any user. For example, it may be known that all "Messages" have a "property" called "PR_SUBJECT" (0x0037001E), but it might not be known that certain messages will be annotated with a new "property" called "PR_FOOBAR" (0x8011001F).

Applications have typically taken two different approaches to store such "highly flexible" schema data in less flexible database systems. In a first such approach, the data is stored in XML or blobs in the database, i.e., the 'schema' of the data is moved to a higher layer in the software stack. The database management system (DBMS) sees a very simple schema largely containing a single "dynamic schema" object. This allows the schema to be stored and manipulated in a consistent manner but robs the data store of the ability to use knowledge of the schema to optimize operations of the data store. In the absence of advanced database features such as XML data processing this approach is practically unusable for commercial applications because of the performance penalty imposed by eliminating the data store's ability to optimize its operations.

In a second such approach, some of the data, i.e., the portion that is known at "data definition" time, is stored in the data store as normal "not dynamic" schema objects, and the remainder is stored in either a blob/XML, or normalized into a "property/value" pair table. This allows the data store to know about as much of the schema as possible, and consequently to use that knowledge in operations. But it requires the application to be written knowing which parts of the schema as "normal" database objects and which are stored as blob/XML or property/value pairs.

The net result of these approaches is that the application writer must choose between exposing their "part structured and part variable" data store schema through their object model, or having a "fully variable" data schema and loose data store level optimization and processing. Consider MAPI as an example. There is no natural and intuitive way for the writer to know that PR_SUBJECT (0x0037001E) maps to Message.Subject in the object model, and column dbo.MessageView.Subject in the data store schema, while PR_FOOBAR (0x8011001F) is not represented in either the object model or data store schema because it is a "new" data property added dynamically.

It would be desirable, therefore, if a mechanism existed via which applications could be written such that the data store can have a "part structured and part variable" data schema. It would be particularly desirable if such a schema were not exposed through the object model.

SUMMARY

Methods for building data encapsulation layers for a highly variable schema are disclosed and claimed. As described in detail below, such methods allow for applications to be written in such a way that a data store can have a "part structured and part variable" data schema. Such a schema need not be exposed through the object model. Application writers can choose an optimal data store schema design, part of which is structured and part of which is variable, without sacrificing integrity of the exposed object model.

An "isolation layer" that defines a relationship between object model data fields and data store data fields may be encoded in the source of the data store interface layer using attributes. Reflection may be used, at application start-time, for example, to build a table of mappings that drive interactions with that data. The use of reflection to build the mapping table eliminates the need for hard-coding such relationships. Consequently, the application code need not change merely because the data store structure changes. An example, three-step process for building and using such an isolation layer is described in detail.

BRIEF DESCRIPTION OF THE DRAWINGS

FIG. 2 provides an example of how to build a mapping table.

FIG. 3 provides an example of how to use a mapping table at run-time.

DETAILED DESCRIPTION

Figure 1:
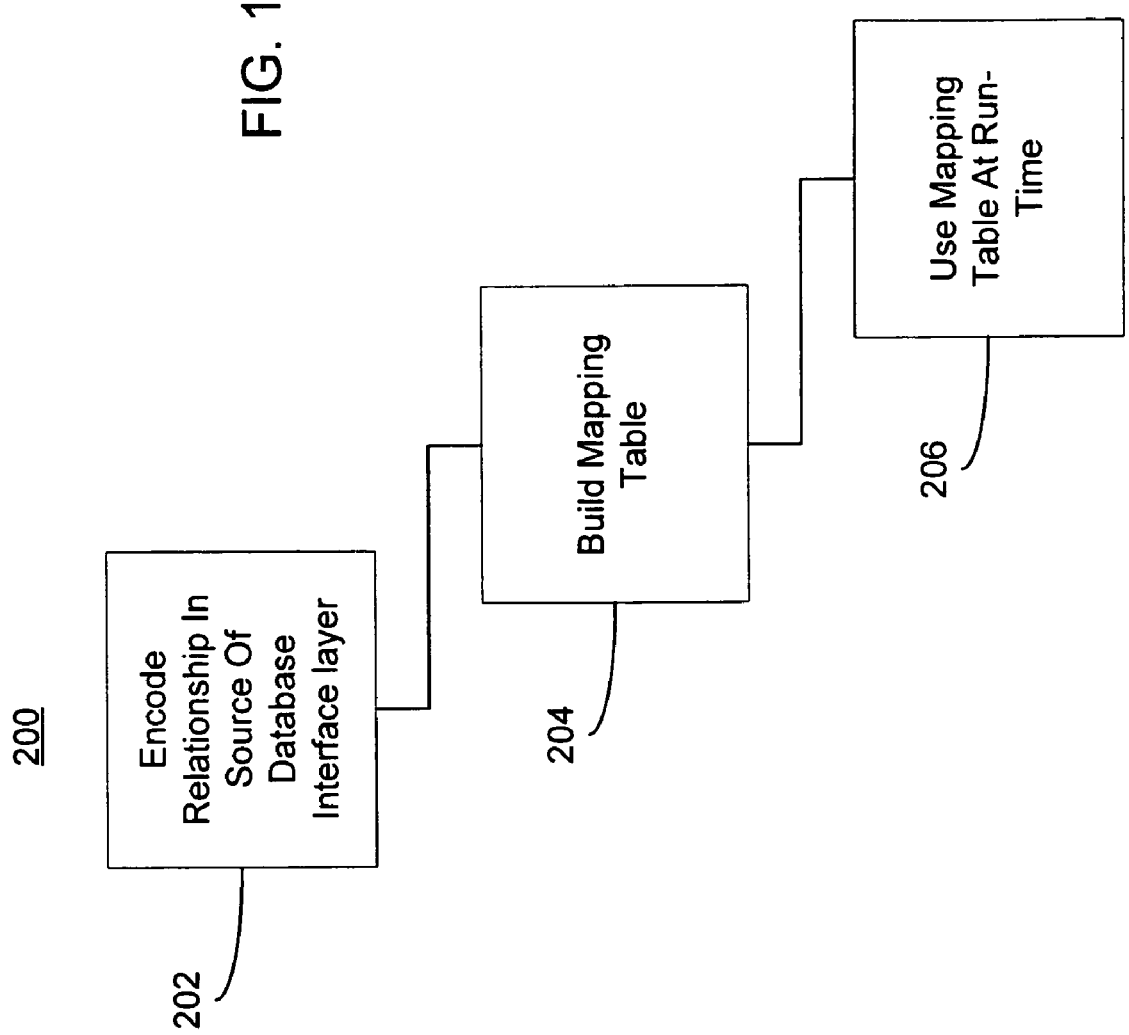
FIG. 1 is a flowchart of an example method for building data encapsulation layers for a highly variable schema.

FIG. 1 depicts a method 200 for building data encapsulation layers for a highly variable schema. At 202, a variable relationship between one or more application object model data fields and one or more data store data fields may be encoded in the source of the data store interface layer of an application. The relationship may be encoded using annotations, such as Microsoft .NET Framework Attributes. For example, to represent that "PR_SUBJECT" in MAPI is "Subject" in the internal object model, and column "subject" in the data store, the data model object could be coded as follows:

---

[MapiUnnamedProperty(PropIds.PropId_SUBJECT, PropType.Unicode)]
[ViewMappingColumn("subject")]
internal string Subject
{ get; set; }.

---

In the foregoing example, "[MapiUnnamedProperty(PropIds.PropId_SUBJECT, PropType. Unicode)]" represents a property that the application uses, i.e., the object model data fields, "[ViewMappingColumn('subject')]" refers to the data store column that the property maps to, i.e., the data store data fields, and "internal string Subject" represents a "data store interface" or "isolation" layer. Thus, the isolation layer, which may define the relationship between the object model data fields and the data store data fields, may be encoded in the source of the data store interface layer using attributes.

It should be understood that many types of mapping relationships may be supported. The foregoing is an example of a 1-to-1-to-1 mapping from end-user, to object-model, to data store. The following is an example of a 1-to-1-to-many mapping from end-user, to object-model, to data store:

```
[MapiUnnamedProperty(PropIds.PropId_MessageId, PropType.Unicode]
[ViewMappingColumn("MIDGuid", "MIDCounter")]
internal ExchangeId MID
{ get; set; }
```

The following is an example of a 1-to-1-to-function mapping:

```
[MapiUnnamedProperty(PropIds.PropId_Unread, PropType.Unicode]
[ViewMappingFunction("UnreadItems+UnreadAppointments")]
internal UnreadCount
{ get; set; }
```

A host of others are possible.

At 204, a mapping table may be built. The mapping table may be derived from the variable relationship encoded into the data store interface layer of the application, and may map a specific relationship between the object model data fields and the data store data fields that exists at start-up time. Thus, the application code need not change merely because the data store structure changes.

Such a mapping table may be built using a technique that is commonly referred to as "reflection," such as Microsoft .NET Framework Reflection, for example. That is, the executable code associated with an application may "look at" the source code associated with the application (e.g., the source code from which the executable code was compiled) and identify certain relationships from the source code.

FIG. 2 provides example code for building a mapping table. As shown, the code may build a mapping table at start-up time for methods and properties. It should be understood that, although such a table may be built at start-up time, it can be built at any desirable time, such as at compilation time or on an as-needed basis during runtime. Such methods may include statics and instance methods. Accordingly, the code may find "ViewMappingFunction"s. Properties may include instance properties only. Accordingly, the code may find property mappings and "ViewMappingColumn"s. The method by which the mapping table is built may, of course, differ depending on the nature of the mapping and the data store schema.

At 206, the mapping table may be used at run-time. That is, when there is a request for a property, the table may be used to determine how to get the data and to invoke the correct mechanism for obtaining the value of the requested property. FIG. 3 provides an example of how to use a mapping table at run-time. As shown, the program loops through the request array and fills the property values.

It should be apparent that a user can invoke "MapiGetProps" to retrieve the desired data from the data store. Thus, the user may be totally shielded from the physical realization of those properties in the object model, or data store. In fact, the "MapiGetProps" function itself may also be shielded. It knows there are two types of properties: those that are handled in the object model and represented in the data store schema, and those that are represented as "property/value" pairs (or XML, or blob). It need not be aware of which properties fall into which set, or why. This logical isolation allows the underlying object model, or data store physical realization, to change without affecting the end-user application.

Example Computing Environment

Figure 4:
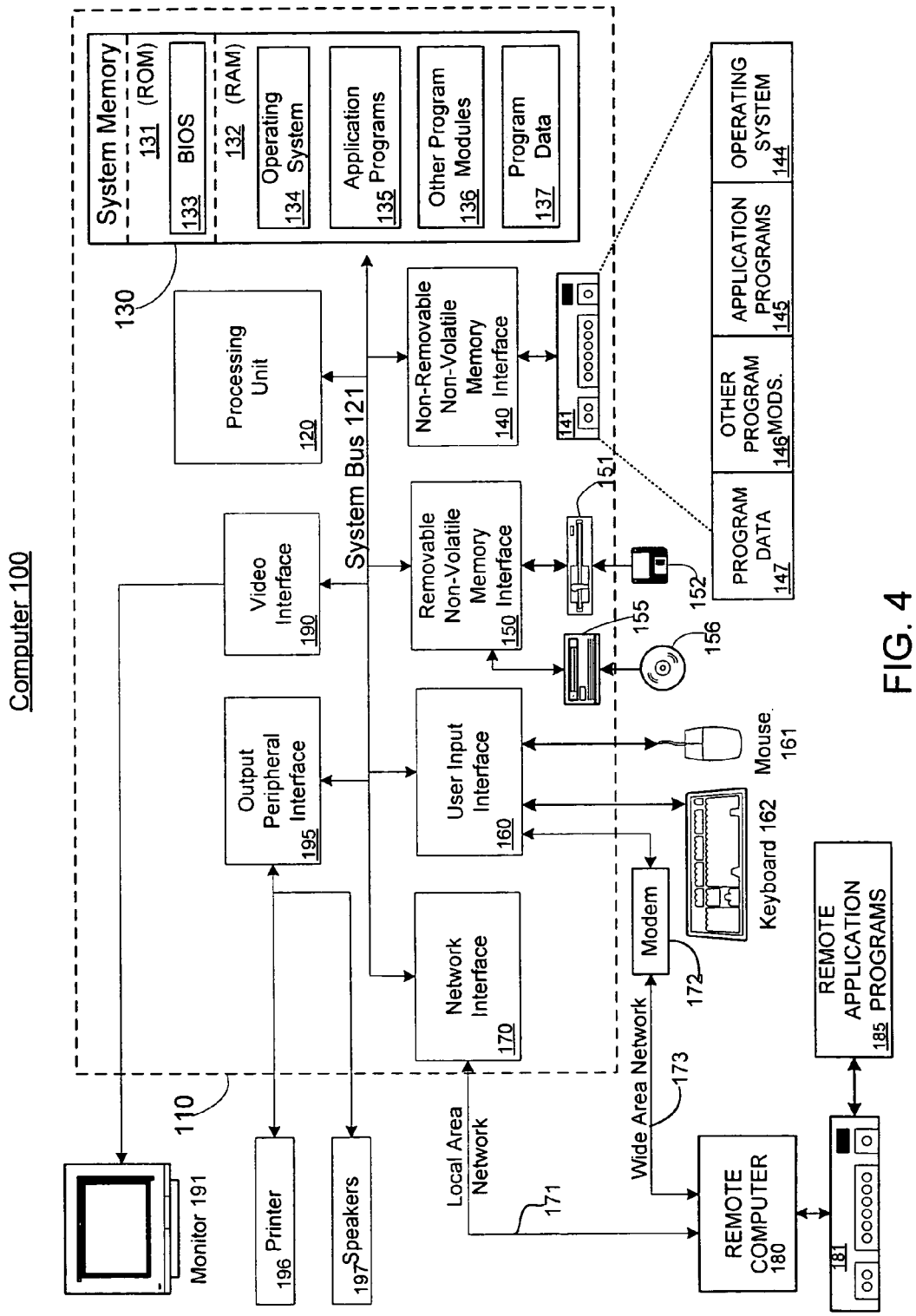
FIG. 4 is a block diagram showing an example computing environment in which aspects of the invention may be implemented.

FIG. 4 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 4 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 4, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4 provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120$a$-$f$ through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

What is claimed:

1. A method for building a data encapsulation layer for a variable schema for a predefined schema data store, the method comprising:
   encoding within a source of a data store interface layer of an application methods and properties of a variable relationship between application object model and data store;
   encoding a data store interface as an isolation layer to encapsulate the variable relationship using attributes;
   building a mapping table, the mapping table being buildable at runtime, by identifying data relationships, methods and properties within executable source code associated with an application;
   reflecting the identified data relationships, methods and properties from the executable source code to an executable mapping table schema;
   using the mapping table schema to map the specific reflected data relationships, methods and properties between the object model and the data store that exist at an application execution time on an as-needed basis during runtime; and
   accessing the mapping table and the data store interface via said encapsulation layer for use during application execution wherein:
      the encapsulation layer allows the mapping table, object model and data store to change without affecting the application code; and
      the variable relationship is encoded in source code that defines the data store interface layer of the application.

2. The method of claim 1, wherein the variable relationship is encoded in the source code using annotations.

3. The method of claim 2, wherein the annotations are attributes.

4. The method of claim 1, wherein the mapping table is built via executable code associated with the application identifying the variable relationship from source code associated with the application.

5. The method of claim 1, wherein the mapping table is built via a process that is a function of a schema associated with the data store.

6. The method of claim 1, wherein the mapping table is used to determine how to retrieve data from the data store.

7. The method of claim 6, wherein the mapping table is used to invoke a mechanism for obtaining a value of an object model data field.

8. The method of claim 7, wherein the mapping table is used in response to a request for a property associated with the data store.

9. An isolation layer for a computer application stored in a computer readable storage medium, the isolation layer comprising computer-executable instructions for:
   receiving, during application run-time execution, a request for a property associated with a data store from the executable application; and
   in response to receiving the request, consulting a mapping table that maps reflected data relationships, methods and properties from the executable application source code into the executable mapping table to access a structured portion of a data store;
   accessing a data store interface that provides a variable relationship, encoded using attributes, between an object model associated with the executable application and data store structure reflecting data relationships, methods and properties associated with the data store during runtime wherein:
      the isolation layer provides for mapping table and data store structure change without affecting the application code; and
      the variable relationship is encoded in source code that defines a data store interface layer of the application; and
   retrieving structured and variable data schema via said isolation layer from the data store based on the relationship.

10. The isolation layer of claim 9, wherein the mapping table provides a mapping from end-user, to object-model, to the data store.

11. The isolation layer of claim 10, wherein the mapping is a 1-to-1-to-1 mapping from end-user, to object-model, to the data store.

12. The isolation layer of claim 10, wherein the mapping is a 1-to-1-to-many mapping from end-user, to object-model, to the data store.

13. The isolation layer of claim 10, wherein the mapping is a 1-to-1-to-function mapping from end-user, to object-model, to the data store.

14. An isolation layer for a computer application stored in a computer readable storage medium, the isolation layer comprising computer-executable instructions for:
   building a mapping table, the mapping table being buildable on an as-needed basis during runtime, that maps a structured relationship between an object model and data store structure by identifying data relationships, methods and properties within executable source code of an executable application, reflecting the identified data relationships, methods and properties from the executable source code to an executable mapping table schema, and using the mapping table schema to map the specific reflected data relationships, methods and properties identified;
   wherein the mapping table is built via executable code associated with the application identifying the relationship from the application executable source code associated with the application;
   accessing a data store interface that provides a variable relationship, encoded using attributes, between object model data fields associated with the executable application and data store structure associated with the data store during runtime, the variable relationship is encoded in source code that defines a data store interface layer of the application; and
   retrieving structured and variable data schema from the data store by accessing the mapping table data store interface via said isolation layer wherein the isolation layer provides for mapping table and data store structure change without affecting the application code.

15. The isolation layer of claim 14, wherein retrieving the data from the data store comprises consulting the mapping table to determine how to get the data and invoke a mechanism for obtaining a value of an object model data field.

16. The isolation layer of claim 14, wherein the data is retrieved in response to a request for a property associated with the data store.

17. The isolation layer of claim 16, further comprising computer-executable instructions for looping through a request array associated with the request and filling property values associated with the property.

18. A method for building a data isolation layer for a variable schema stored in a computer readable storage medium for a predefined schema data store, the method comprising:

encoding an isolation layer using attributes to define a schema data relationship for an executable application, a portion of which is structured and a portion of which is variable;

further encoding the schema data relationship between an application object model and data store structure in a data store interface as an isolation layer to encapsulate a variable relationship, wherein the variable relationship is encoded in source code that defines a data store interface layer of the application;

building a mapping table, the mapping table being buildable on an as-needed basis during runtime, by identifying data relationships, methods and properties within executable source code associated with an application;

reflecting the identified data relationships, methods and properties from the executable source code to an executable mapping table schema;

using the mapping table schema to map the specific reflected data relationships, methods and properties between the object model and the data store that exist at the application execution time; and accessing the mapping table and the data store interface via said data isolation layer during application run-time wherein the isolation layer provides for mapping table and data store structure change without affecting the application code.

* * * * *